United States Patent
Yoshiura

(10) Patent No.: US 10,886,719 B2
(45) Date of Patent: Jan. 5, 2021

(54) WATERPROOF COVER AND WIRE HARNESS

(71) Applicant: SUMITOMO WIRING SYSTEMS, LTD., Yokkaichi (JP)

(72) Inventor: Tadahiro Yoshiura, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 63 days.

(21) Appl. No.: 16/474,974

(22) PCT Filed: Jan. 12, 2018

(86) PCT No.: PCT/JP2018/000587
§ 371 (c)(1),
(2) Date: Jun. 28, 2019

(87) PCT Pub. No.: WO2018/135388
PCT Pub. Date: Jul. 26, 2018

(65) Prior Publication Data
US 2019/0334339 A1    Oct. 31, 2019

(30) Foreign Application Priority Data

Jan. 20, 2017  (JP) .................................. 2017-008598

(51) Int. Cl.
*H02G 15/013* (2006.01)
*B60R 16/02* (2006.01)
*H02G 3/04* (2006.01)

(52) U.S. Cl.
CPC ....... *H02G 15/013* (2013.01); *B60R 16/0222* (2013.01); *H02G 3/0418* (2013.01)

(58) Field of Classification Search
CPC . H02G 15/013; H02G 3/0418; B60R 16/0222
(Continued)

(56) References Cited

U.S. PATENT DOCUMENTS 9,302,635 B2 * 4/2016 Han ..................... H02G 15/013
2015/0101842 A1 * 4/2015 Han .................... B60R 16/0215
174/50.57

FOREIGN PATENT DOCUMENTS

JP    H02-073151 U    6/1990
JP    H09-035807 A    2/1997
(Continued)

OTHER PUBLICATIONS

Feb. 13, 2018 International Search Report issued in International Patent Application PCT/JP2018/000587.

*Primary Examiner* — Timothy J Thompson
*Assistant Examiner* — Michael F McAllister
(74) *Attorney, Agent, or Firm* — Oliff PLC

(57) ABSTRACT

A waterproof cover that is configured to be connected to an external member of a protection tube that protects an electric wire, the waterproof cover including a wall; a ventilation through which air can pass, wherein: the ventilation includes a pair of contact surfaces that are provided penetrating the wall and are in contact with each other, and the pair of contact surfaces are configured to separate from each other due to the ventilation deforming based on a difference occurring between an internal pressure and an external pressure of the protection tube, and the ventilation is formed integrated with the wall; and a body surrounding the ventilation, wherein a thickness of the body is larger than a thickness of the wall located outside the body.

4 Claims, 3 Drawing Sheets

(58) Field of Classification Search
USPC .................................................... 174/50.57
See application file for complete search history.

(56)     References Cited

FOREIGN PATENT DOCUMENTS

| | | |
|---|---|---|
| JP | 2003-294047 A | 10/2003 |
| JP | 2013-241143 A | 12/2013 |

* cited by examiner

WATERPROOF COVER AND WIRE HARNESS

This application is the U.S. National Phase of PCT/JP2018/000587 filed Jan. 12, 2018, which claims priority to JP 2017-008598 filed Jan. 20, 2017, the entire disclosure of which is incorporated herein by reference.

BACKGROUND

The present disclosure relates to a waterproof cover of a protection tube for protecting an electric wire, and a wire harness including the waterproof cover.

An electric wire is covered with a protection tube in order to protect the electric wire from water, dust, and the like. An electric wire is routed in various forms, and thus a protection tube is constituted as a linking member for linking various types of tubes having different structures. For example, a protection tube includes an external member that protects an intermediate portion other than an end portion of an electric wire, and a waterproof rubber cover that protects a portion between the external member and a connector of an end portion of the electric wire. Because the protection tube seals off a portion between connectors at both ends of the electric wire, a difference between the internal pressure and the external pressure of the protection tube may increase due to a change in temperature, atmospheric pressure, and the like. In order to reduce an increase in the difference between the internal and external pressure, the waterproof cover is provided with a ventilation apparatus. A ventilation apparatus is provided with a gas-permeable filter with gas permeability and waterproofing and dustproofing functions (see JP 2013-241143A).

SUMMARY

Incidentally, if the waterproof cover of the protection tube is provided with such a ventilation apparatus, the number of parts increases. From this point of view, there is still room for improvement of a conventional waterproof cover.

(1) A waterproof cover according to a first aspect of the disclosure is configured to be connected to an external member of a protection tube that protects an electric wire, the waterproof cover including a wall; a ventilation through which air can pass, wherein: the ventilation includes a pair of contact surfaces that are provided penetrating the wall and are in contact with each other, and the pair of contact surfaces are configured to separate from each other due to the ventilation deforming based on a difference occurring between an internal pressure and an external pressure of the protection tube, and the ventilation is formed integrated with the wall.

According to this configuration, the pressure in the protection tube can be adjusted using a configuration with fewer parts than with a conventional structure.

(2) In the waterproof cover, the contact of the ventilation including the contact surfaces is thinner than a periphery of the contact.

According to this configuration, the contact is more likely to deform, compared to the periphery of the contact, and thus it is possible to reduce a pressure difference that can cause the pair of contact surfaces to separate from each other.

(3) The waterproof cover is provided with a body surrounding the ventilation, wherein a thickness of the body is larger than a thickness of the wall located outside the body.

There is a risk that, when the waterproof cover is bent, the ventilation will deform and the pair of contact surfaces will separate from each other. In this regard, according to the above-described configuration, the ventilation is surrounded by the body, and thus it is possible to keep the ventilation in the body from deforming due to the surrounding region of the ventilation deforming.

(4) The waterproof cover is made of rubber or an elastomer.

This configuration makes it possible to make the external member and the waterproof cover be in tight contact with each other, and thus to keep water from entering from a gap between the external member and the waterproof cover.

(5) A wire harness with which the issues are resolved includes a protection tube including any one of the waterproof covers and an electric wire that is inserted into the protection tube.

A waterproof cover and a wire harness according to some aspects of the present disclosure can be constituted by fewer parts, compared to a conventional waterproof cover and a conventional wire harness.

DETAILED DESCRIPTION OF EMBODIMENTS

A wire harness 1 will be described with reference to FIGS. 1 to 5.

The wire harness 1 electrically connects two or more electric apparatuses. Examples of electric apparatuses include vehicle driving motors, motors of various electric components installed in a vehicle, and power supply apparatuses.

Figure 1:
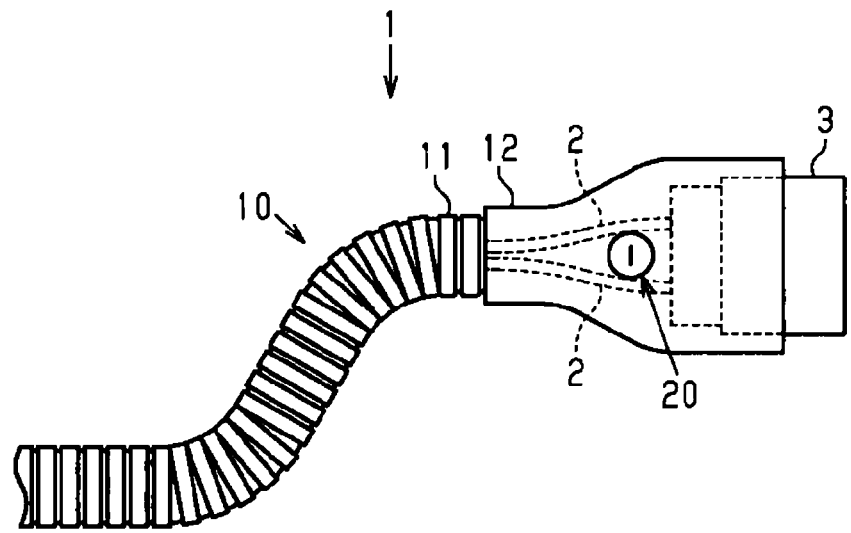
FIG. 1 is a schematic diagram of a wire harness.

As shown in FIG. 1, the wire harness 1 includes one or more electric wires 2 coated in resin, a connector 3 attached to end portions of the electric wires 2, and a protection tube 10 that protects the electric wires 2. The protection tube 10 protects the electric wires 2 from flying objects, water, and the like. For example, if the electric wires 2 are installed in a vehicle without the protection tube, there is a risk that flying stones (flying object) will hit the electric wires 2 while the vehicle is traveling and scratch the coating. The electric wires 2 are protected by the protection tube 10 for the purpose of suppressing such impairment and the like of the electric wires 2.

The protection tube 10 includes a tubular external member 11 covering the electric wires 2, and a tubular waterproof cover 12 attached extending between the connector 3 and the external member 11. The waterproof cover 12 is attached to an end portion of the external member 11 to cover this end portion. This waterproof cover 12 covers portions of the electric wires 2 that are not covered by the external member 11. Note that the waterproof cover 12 is also referred to as a "grommet". The external member 11 is constituted by a flexible corrugated tube or a rigid tube that is unlikely to warp, for example. The external member 11 and the waterproof cover 12 are fastened to each other with a band, tape, or the like. Also, the waterproof cover 12 and the connector 3 are fastened to each other with a band, tape, or the like.

At least a portion of the waterproof cover 12 that is to be fastened with a band, tape, or the like is constituted by rubber or an elastomer. Although there is no limitation on the type of rubber and the type of elastomer, rubbers and elastomers having high chemical resistance such as resistance against a cryoprotectant (e.g., calcium chloride) are preferable, for example. In an embodiment, the entire waterproof cover 12 is made of an elastomer (e.g., a polyamide-based elastomer).

Figure 2:
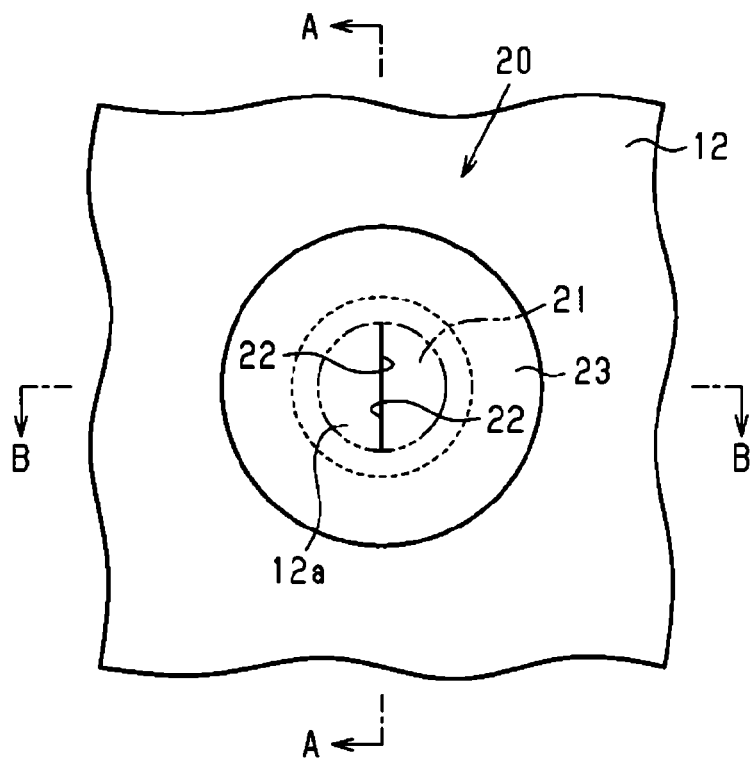
FIG. 2 is a plan view of a ventilation portion.

As shown in FIG. 2, the protection tube 10 is provided with a ventilation portion 20 (ventilation) for adjusting the internal pressure. Herein, in the protection tube 10, the external member 11 and the waterproof cover 12 are watertightly fastened to each other, and the waterproof cover 12 and the connector 3 are watertightly fastened to each other, and thus the inside and the outside of the protection tube 10 are isolated from each other. Thus, there is a risk that a pressure difference between the inside and the outside of the protection tube 10 will increase, and if a difference between the internal pressure and the external pressure increases, there is a risk that the protection tube 10 will expand or deform, and deterioration thereof will advance. In view of this, in order to suppress an increase in such a pressure difference, the protection tube 10 is provided with the ventilation portion 20.

Air can pass through the ventilation portion 20, and the ventilation portion 20 prevents water from entering. The ventilation portion 20 has a pair of contact surfaces 22. The pair of contact surfaces 22 are provided penetrating a wall 12a constituting the waterproof cover 12 and are in contact with each other. Specifically, the pair of contact surfaces 22 are in watertight contact with each other, the contact surfaces being capable of separating from each other.

Figure 3:
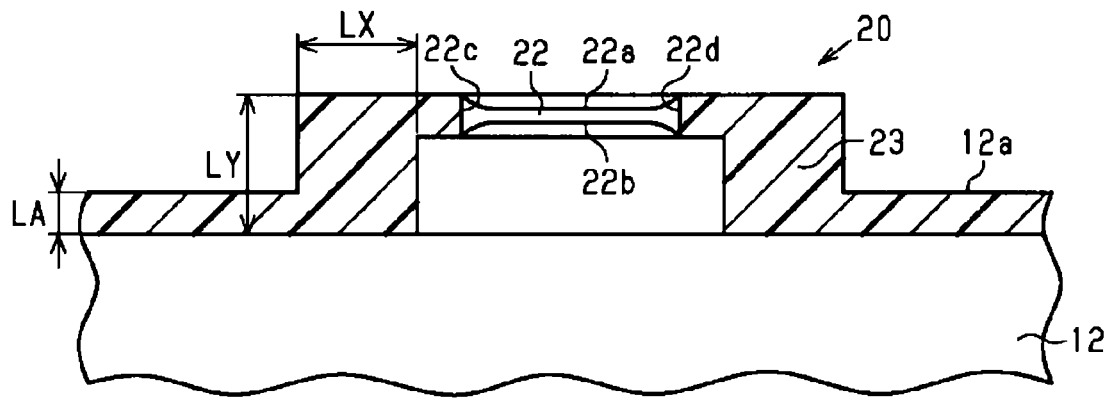
FIG. 3 is a cross-sectional view of the ventilation portion taken along line A-A in FIG. 2.
Figure 4:
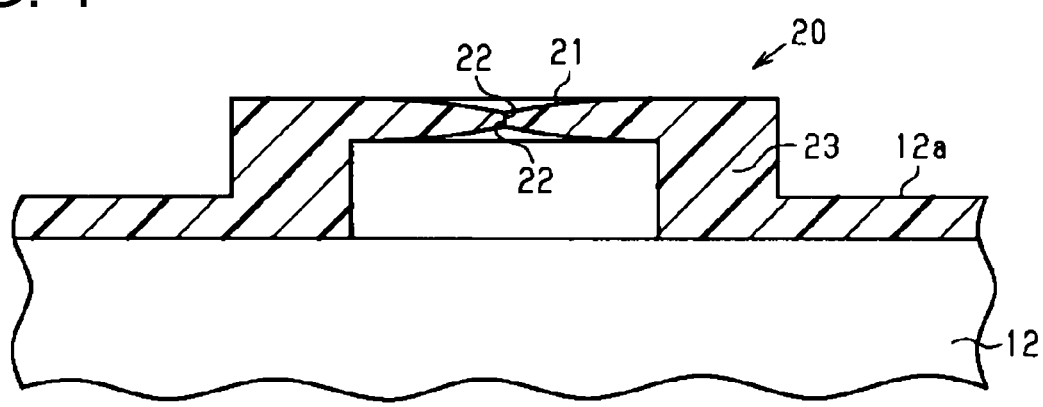
FIG. 4 is a cross-sectional view of the ventilation portion when the ventilation portion is closed, taken along line B-B in FIG. 2.
Figure 5:
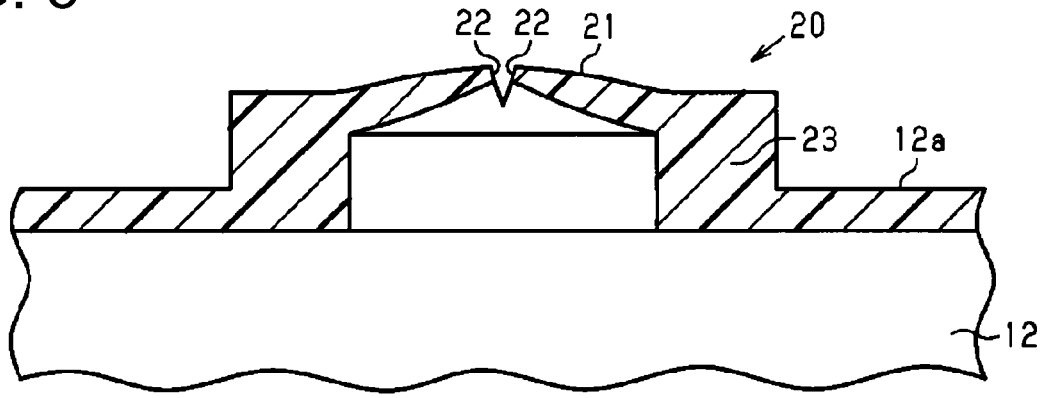
FIG. 5 is a cross-sectional view of the ventilation portion when the ventilation portion is open, taken along line B-B in FIG. 2.

As shown in FIG. 3, the contact surfaces 22 each include an outer edge 22a, which is a boundary with an outer surface of the wall 12a constituting the waterproof cover 12, an inner edge 22b, which is a boundary with an inner surface of the wall 12a constituting the waterproof cover 12, a first end 22c, which is one end connecting the outer edge 22a and the inner edge 22b, and a second end 22d, which is the other end connecting the outer edge 22a and the inner edge 22b. The first end 22c and the second end 22d extend in the thickness direction of the wall 12a. The distance between the outer edge 22a and the inner edge 22b, that is, the smallest width of the contact surface 22, is large enough to prevent water from entering. Such a contact surface 22 is formed in a manner of cutting the wall 12a, for example.

Such a pair of contact surfaces 22 separate from each other due to the ventilation portion 20 deforming based a difference occurring between the internal pressure and the external pressure of the protection tube 10. That is, a portion including the contact surfaces 22 (hereinafter, a "contact portion 21" (contact), that is, a portion surrounded by a two-dot chain line in FIG. 2.) undergoes elastic deformation based on a pressure difference. Note that the contact portion 21 is a portion of the wall 12a of the waterproof cover 12.

Preferably, the contact portion 21 is thinner than a peripheral portion of the contact portion 21 in the waterproof cover 12. That is, the contact portion 21 is more likely to warp than a peripheral portion of the contact portion 21 is. This improves the air permeability of the ventilation portion 20. For example, the thickness of the contact portion 21 gradually decreases toward the contact surfaces 22 in a direction intersecting the contact surfaces 22 (see FIG. 4).

More preferably, the ventilation portion 20 is provided with an annular thick portion 23 (body) surrounding the ventilation portion 20. A thickness LY of the thick portion 23 is larger than a thickness LA of the wall 12a located outside the thick portion 23 in the waterproof cover 12. Also, a width LX of the thick portion 23 is larger than the thickness LA of the wall 12a located outside the thick portion 23 (see FIG. 3). Note that the thick portion 23 is a portion of the wall 12a of the waterproof cover 12.

The waterproof cover 12 of the protection tube 10 is sometimes bent when the wire harness 1 is being installed. If the waterproof cover 12 is bent at a large curvature, there is a risk that the ventilation portion 20 will deform, the contact surfaces 22 will separate from each other, and the ventilation portion 20 will stay open. The thick portion 23 has an annular shape, and thus the thick portion 23 and the shape of its inner portion are unlikely to deform even if the contact portion 21 undergoes such deformation (for example, bending deformation). Accordingly, the contact surfaces 22 are kept from separating from each other. The functional effect of the ventilation portion 20 will be described with reference to FIGS. 4 and 5.

When an electric current flows through the electric wires 2 and air in the protection tube 10 is heated, the internal pressure of the protection tube 10 becomes higher than the external pressure thereof and the protection tube 10 expands. For example, if the wire harness 1 is connected to an inverter of a motor for driving a vehicle, a high-voltage alternating current is applied to the electric wires 2, and thus the temperature of the electric wires 2 increases and air tends to be heated. When the protection tube 10 expands, in particular, the waterproof cover 12, which is more likely to expand than the external member 11, expands. In particular, the contact portion 21 is thin, and thus is likely to deform. Thus, the contact portion 21 deforms, and the contact surfaces 22 separate from each other. Accordingly, air in the protection tube 10 is discharged therefrom, and a difference between the internal pressure and the external pressure of the protection tube 10 is reduced. When the difference between the internal pressure and the external pressure is reduced, the contact portion 21 returns to the original shape, and the contact surfaces 22 are closed.

The functional effects and effects of the waterproof cover 12 and the wire harness 1 according to the present embodiment will be described.

(1) The waterproof cover 12 has a ventilation portion 20 through which air can pass. The ventilation portion 20 has a pair of contact surfaces 22. The pair of contact surfaces 22 are provided penetrating a wall 12a constituting the waterproof cover 12 and are in contact with each other. The pair of contact surfaces 22 separate from each other due to the ventilation portion 20 deforming based on a difference occurring between the internal pressure and the external pressure of the protection tube 10. This configuration makes it possible to adjust air in the protection tube 10 using fewer constituent parts, compared with a conventional structure.

Also, a conventional structure has required attachment of a ventilation apparatus to a waterproof cover. In contrast, according to this configuration, the ventilation portion 20 is formed integrated with the waterproof cover 12, and thus it is possible to omit an operation for attaching the ventilation portion 20 to the waterproof cover 12.

(2) The contact portion 21 including the contact surfaces 22 is thinner than a peripheral portion of the contact portion 21 in the waterproof cover 12. According to this configuration, the contact portion 21 is more likely to deform, compared to the periphery thereof (that is, the surrounding region of the contact portion 21), and thus it is possible to reduce a pressure difference that can cause the pair of contact surfaces 22 to separate from each other.

(3) The waterproof cover 12 is provided with the thick portion 23 surrounding the ventilation portion 20. The thickness LY of the thick portion 23 is larger than the thickness LA of the wall 12a located outside the thick portion 23 in the waterproof cover 12.

If the waterproof cover 12 is bent, there is a risk that the ventilation portion 20 will deform and the pair of contact surfaces 22 will separate from each other. In this regard, according to the above-described configuration, the ventilation portion 20 is surrounded by the thick portion 23, and thus it is possible to keep the ventilation portion 20 in the thick portion 23 from deforming due to the surrounding region of the ventilation portion 20 deforming. Accordingly, a state is unlikely to occur in which the pair of contact surfaces 22 are separated from each other, and the ventilation portion 20 is unlikely to stay open.

(4) The above-described waterproof cover 12 is made of rubber or an elastomer. This configuration makes it possible to make the external member 11 and the waterproof cover 12 be in tight contact with each other, and thus to keep water from entering from a gap between the external member 11 and the waterproof cover 12.

(5) The wire harness 1 includes the protection tube 10 including any of the above-described waterproof covers 12, and the electric wires 2 that are inserted into the protection tube 10. The number of parts of this wire harness 1 is smaller than that of a wire harness that has a conventional structure.

Other Embodiments

The structure of the above-described waterproof cover 12 is not limited to the above-described embodiment.

Although the ventilation portion 20 is provided in the waterproof cover 12 for connection between the external member 11 and the connector 3 in an embodiment, the waterproof cover 12 to which the ventilation portion 20 is provided is not limited thereto. For example, if a plurality of bundled electric wires 2 are routed in two different directions, a three-branch waterproof cover 12 is provided in a branched portion of the electric wires 2. Such a waterproof cover 12 is connected to the external member 11. This type of waterproof cover 12 is also provided with the ventilation portion 20.

Although the ventilation portion 20 has one set of a pair of contact surfaces 22 in the above-described embodiment, the number of sets of the pair of contact surfaces 22 is not limited.

Figure 6:
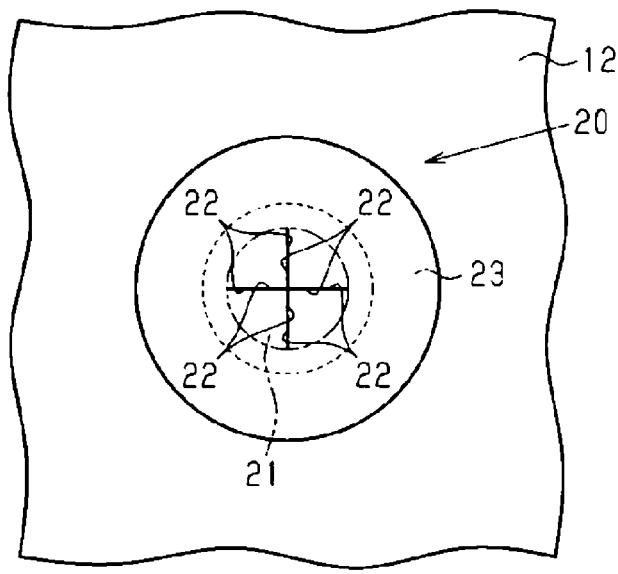
FIG. 6 is a plan view of a first variation of the ventilation portion.

As shown in FIG. 6, the ventilation portion 20 may include four sets of the pair of contact surfaces 22, for example. The four sets of contact surfaces 22 are arranged in a "+" shape, for example. Also, as another form, the ventilation portion 20 may include two sets of the pair of contact surfaces 22. In this case, each set of the pair of contact surfaces 22 are arranged in parallel to each other (not shown).

Although the thick portion 23 surrounding the ventilation portion 20 is provided to protrude outward from the wall 12a of the waterproof cover 12 in the above-described embodiment, the thick portion 23 may be provided to protrude inwardly therefrom.

Figure 7:
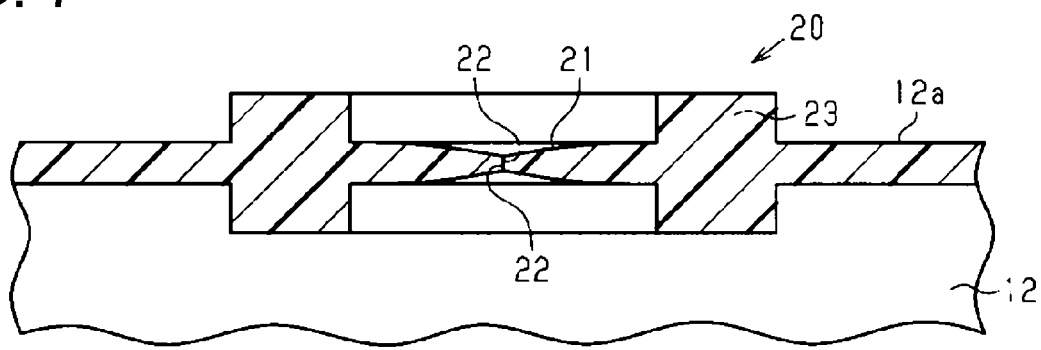
FIG. 7 is a cross-sectional view of a second variation of a ventilation portion.

Also, as shown in FIG. 7, the thick portion 23 may be provided to protrude inwardly and outwardly from the wall 12a of the waterproof cover 12.

Figure 8:
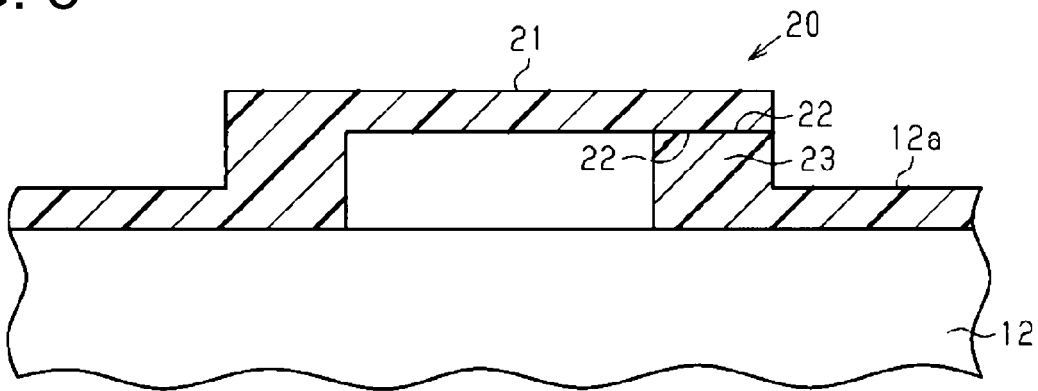
FIG. 8 is a cross-sectional view of a third variation of a ventilation portion.

As shown in FIG. 8, the pair of contact surfaces 22 may be provided in the annular thick portion 23. The thick portion 23 constitutes a portion of the wall 12a. The pair of contact surfaces 22 are provided penetrating the thick portion 23 serving as the wall 12a separating the inside and the outside of the waterproof cover 12.

The waterproof cover 12 shown in the drawings is sometimes referred to as a "liquid-tight sealing sleeve". The ventilation portion 20 shown in the drawings is sometimes referred to as a "non-electric ventilator". The contact portion 21 and the contact surface 22 that are shown in the drawings are sometimes referred to as an "elastically deformable valve element", and/or a "plurality of elastically deformable leaflets". In particular, the contact portion 21 shown in FIG. 8 is sometimes referred to as a "flap valve", and the ventilation portion 20 shown in FIG. 8 is sometimes referred to as a "flap ventilator". In any example, a valve element is configured to close a ventilator when the difference between the internal pressure and the external pressure of a liquid-tight sealing sleeve is in a predetermined pressure range, and to undergo elastic deformation and open the ventilator when the difference between the internal pressure and the external pressure of the liquid-tight sealing sleeve is out of the predetermined pressure range. Elastic deformation of the valve element makes it possible to restore the difference between the internal pressure and the external pressure of the liquid-tight sealing sleeve to the predetermined pressure range without consuming power. For example, the external member 11, which may be a corrugated tube, is sometimes bent, compressed, or extended in the longitudinal direction to be fitted to a routing path, in a process for routing the wire harness 1 in an automobile. The difference between the internal and external pressure of the liquid-tight sealing sleeve may exceed a predetermined pressure range due to the external member 11 undergoing such deformation. As a result of a valve element undergoing elastic deformation due to this pressure difference, and cancelling the pressure difference, a repulsive force against an operation for fitting the external member 11 to the routing path, that is, resistance against this operation, is reduced, and thus a process for routing the wire harness 1 can be easily performed.

The present disclosure encompasses the following implementation examples. Reference numerals of constituent elements in an embodiment are given to aid for understanding and not for limitation.

Additional Remark 1

A waterproof cover (12) according to any implementation example is configured to form a wire harness (1) together with at least one electric wire (2), an electric wire protection tube (11) for protecting the at least one electric wire (2), and an electric connector (3) that is connected to an end portion of the at least one electric wire (2), and the waterproof cover (12) includes a liquid-tight sealing sleeve (12) that connects the electric wire protection tube (11) and the electric connector (3) in an in-line manner, the liquid-tight sealing sleeve (12) covering a connection portion between the at least one electric wire (2) and the electric connector (3), and a non-electric ventilator (20) provided in the liquid-tight sealing sleeve (12).

Additional Remark 2

The ventilator (20) includes at least one elastically deformable valve element (22), in which the at least one valve element (22) is configured to close the ventilator (20) when a difference between an internal pressure and an external pressure of the liquid-tight sealing sleeve (12) is in a predetermined pressure range, and to open the ventilator (20) when the difference between the internal pressure and the external pressure of the liquid-tight sealing sleeve (12) is out of the predetermined pressure range.

Additional Remark 3

In any of the implementation examples, the at least one valve element (22) is a plurality of leaflets.

Additional Remark 4

In any of the implementation examples, the at least one valve element (22) is a flap.

Additional Remark 5

In any of the implementation examples, the waterproof cover (12) is a one-piece component made of a weather resistant material, the waterproof cover (12) including the liquid-tight sealing sleeve (12) and the ventilator (20).

It will be apparent for a person skilled in the art that the present disclosure may be embodied in any other unique mode without departing from the technical idea thereof. For example, some of the components described in an embodiment (or one or more modes thereof) may be omitted, or may be combined.

The invention claimed is:

1. A waterproof cover that is configured to be connected to an external member of a protection tube that protects an electric wire, the waterproof cover comprising:
   a wall;
   a ventilation through which air can pass, wherein:
      the ventilation includes a pair of contact surfaces that are provided penetrating the wall and are in contact with each other, and
      the pair of contact surfaces are configured to separate from each other due to the ventilation deforming based on a difference occurring between an internal pressure and an external pressure of the protection tube, and the ventilation is formed integrated with the wall; and
   a body surrounding the ventilation, wherein a thickness of the body is larger than a thickness of the wall located outside the body.

2. The waterproof cover according to claim 1, wherein a contact of the ventilation including the contact surfaces is thinner than a periphery of the contact.

3. The waterproof cover according to claim 1, wherein the waterproof cover is made of rubber or an elastomer.

4. A wire harness comprising:
   the protection tube including the waterproof cover according to claim 1; and
   the electric wire that is inserted into the protection tube.

* * * * *